(12) United States Patent
Ito

(10) Patent No.: US 6,994,290 B2
(45) Date of Patent: Feb. 7, 2006

(54) MAGNETIC TAPE MANUFACTURING APPARATUS

(75) Inventor: Hiromichi Ito, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/437,384

(22) Filed: May 14, 2003

(65) Prior Publication Data

US 2003/0213430 A1   Nov. 20, 2003

(30) Foreign Application Priority Data

May 16, 2002   (JP)   ............................. 2002-140910

(51) Int. Cl.
   *B65H 18/08*   (2006.01)
(52) U.S. Cl. .................................. 242/530; 242/419.9
(58) Field of Classification Search ............ 242/530.1, 242/530.3, 419.9, 615.4, 530, 615.2, 156.2
   See application file for complete search history.

(56) References Cited

U.S. PATENT DOCUMENTS 4,201,352 A  *  5/1980  Madachy ................. 242/419.4
4,438,888 A  *  3/1984  Seelinger ................. 242/530.3
6,745,976 B1  *  6/2004  Marion .................... 242/615.4

FOREIGN PATENT DOCUMENTS

JP    2001-187660 A    7/2001
WO   WO 90/05690     *  5/1990  ............. 242/419.9

* cited by examiner

*Primary Examiner*—John Q. Nguyen
(74) *Attorney, Agent, or Firm*—Sughrue Mion, PLLC

(57) ABSTRACT

The magnetic tape manufacturing apparatus draws out a wide web-like magnetic tape material wound in roll form from the delivery side, slits the magnetic tape material into a plurality of narrow magnetic tapes by use of a slitter while transporting the magnetic tape material, and winds the narrow magnetic tapes on cores on the winding side through a tape transporting device. In the tape transporting device, roller members supporting the narrow magnetic tapes are mounted on supporting shafts, respectively, and an eddy current type clutch is internally mounted on at least one of the supporting shafts so that the eddy current type clutch controls rotation of the one of supporting shafts to control tension of the narrow magnetic tape supported on the roller member mounted on the one of supporting shafts. Hence, by making the tension of the individual magnetic tapes uniform, productivity and product quality can be stabilized and improved and yield can also be improved.

6 Claims, 5 Drawing Sheets

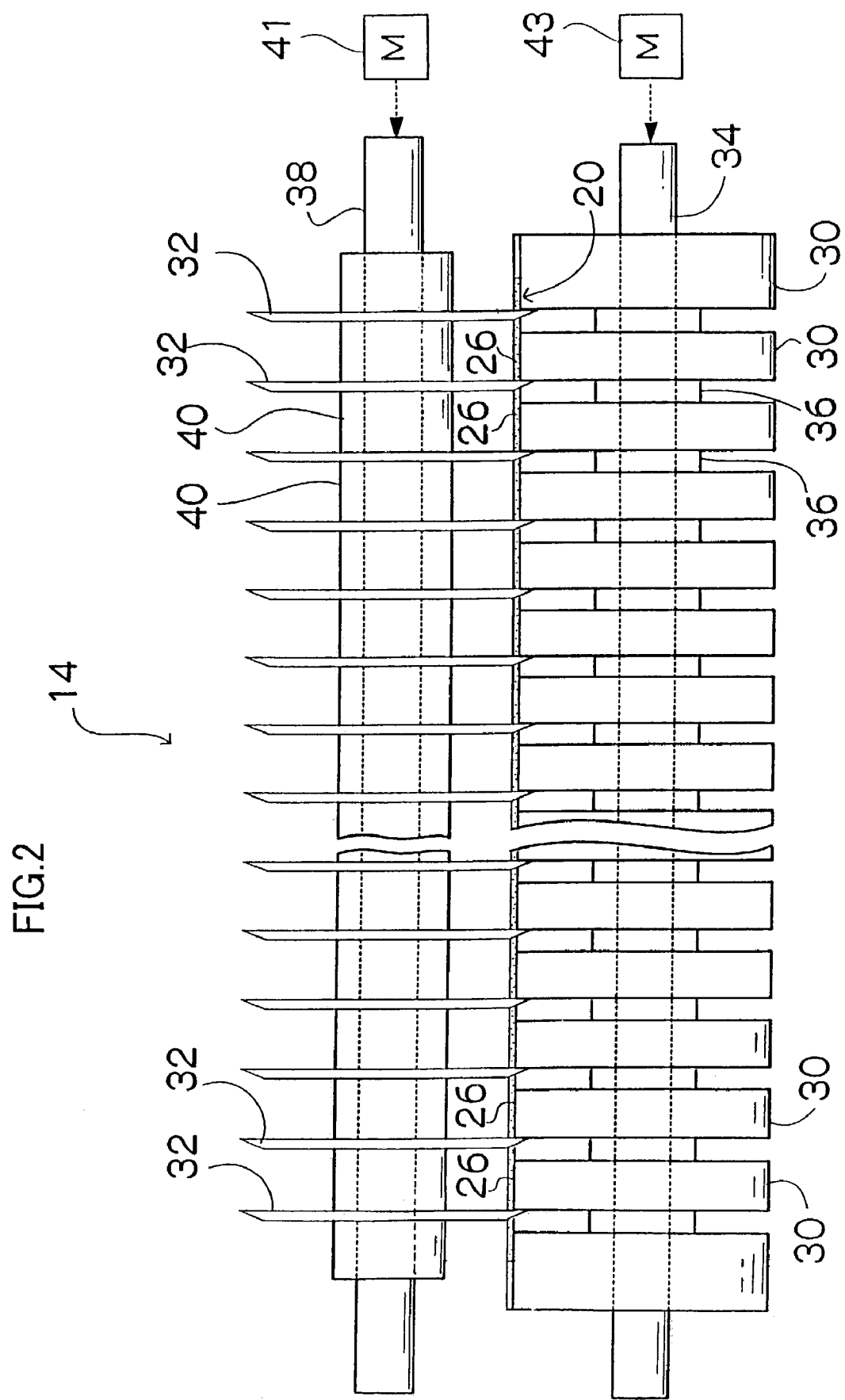

MAGNETIC TAPE MANUFACTURING APPARATUS

BACKGROUND OF THE INVENTION

1. Field of the Invention

The present invention relates to a method of manufacturing magnetic tape and, more particularly, to a method of manufacturing magnetic tape such as tape for computer data backup, audiotape and videotape.

2. Description of the Related Art

In a method of manufacturing various types of magnetic tape such as tape for computer data backup, audiotape and videotape, a wide web-like magnetic tape material wound in roll form is drawn out from the delivery side, and slit into a plurality of narrow magnetic tapes by use of a slitter while being transported, and the magnetic tapes are wound on cores on the winding side.

A conventional slitter used in the manufacturing of magnetic tapes is a device that slits a wide web-like magnetic tape material into a plurality of magnetic tapes by use of pairs of upper and lower rotary blades. The rotary blades are generally constituted by a plurality of rotary blades formed as bed knives in roller form and a plurality of rotary blades in thin disk form, which perform slitting by giving a shearing force to the magnetic tape material between the rotary blades.

In order to obtain a good coil shape in the take-up step in the manufacturing of the magnetic tape material used in manufacturing such magnetic tape, the tape material is wound around in the shape of a crowned roll in which the thickness of the middle portion of the roll is larger than the thickness of both ends of the roll. That is, in a magnetic tape material before slitting into a plurality of magnetic tapes, the outside diameter of the middle portion of the roll is larger than the outside diameter of both ends of the roll.

When this magnetic tape material is slit into a plurality of magnetic tapes, a magnetic tape material taken from the middle portion of the roll and magnetic tape materials taken from both ends of the roll have different lengths, thereby causing the slack of magnetic tapes or the generation of extreme tension in magnetic tapes. This causes the problem of poor running of magnetic tapes due to the slack of magnetic tapes, the problem of variations in the tape width of magnetic tape products due to the tension of magnetic tapes, etc.

Moreover, cleaning devices each provided with a polishing head are often provided in the transporting paths of magnetic tapes. Then, if there are variations in the tension of magnetic tapes, a polishing head coming into contact with a magnetic tape under low tension is apt to be especially worn, thus causing a problem as is often pointed out.

However, the tension control of magnetic tapes by guide rollers used in conventional apparatuses for manufacturing magnetic tape is performed by use of a single guide roller (for example, a grooved suction drum) for a plurality of magnetic tapes. For this reason, these conventional apparatuses are inadequate for solving the above-described problems.

On the other hand, as disclosed in Japanese Patent Application Publication No. 2001-187660, for example, there is a proposal involving reducing the tension cutoff capacity which causes the tension of an upstream magnetic tape to differ from the tension of a downstream magnetic tape. It is said that the occurrence of problems as described above can be reduced by using devices incorporating such a proposal.

However, even when various known devices are adopted, it is difficult to make the tension of individual magnetic tapes completely uniform, and possibility that problems due to the slack of magnetic tapes etc. might arise has not been dismissed as yet.

SUMMARY OF THE INVENTION

The present invention was made in view of this situation and has as its object the provision of a magnetic tape manufacturing apparatus which can improve productivity and product quality by controlling tension to a desired value, in the manufacturing of magnetic tape which involves slitting a magnetic tape material into a plurality of narrow magnetic tapes and taking up the narrow magnetic tapes on cores on the take-up side, so that the tension applied to individual magnetic tapes becomes constant even in a case where there are variations in the length of the slit magnetic tapes.

To attain the above-described object, the present invention is directed to a magnetic tape manufacturing apparatus, comprising: a tape supply device which draws out a wide web-like magnetic tape material wound in roll form from a delivery side; a slitter which slits the magnetic tape material into a plurality of narrow magnetic tapes; a tape take-up device which takes up the narrow magnetic tapes individually on cores on a take-up side; and a tape transporting device which is provided between the slitter and the tape take-up device and guides the narrow magnetic tapes to the tape take-up device, wherein: the tape transporting device includes a plurality of roller members which support the narrow magnetic tapes, the plurality of roller members are mounted on a plurality of supporting shafts, respectively, and an eddy current type clutch is internally mounted on at least one of the plurality of supporting shafts, the eddy current type clutch controlling rotation of the one of the plurality of supporting shafts to control tension of the narrow magnetic tape supported on the roller member mounted on the one of the plurality of supporting shafts.

According to the present invention, in the tape transporting device which is provided between the slitter and the tape take-up device and guides the narrow magnetic tapes to the tape take-up device, the plurality of roller members supporting the narrow magnetic tapes are mounted on the plurality of supporting shafts, respectively, and an eddy current type clutch is internally mounted on at least one of the plurality of supporting shafts so that the eddy current type clutch controls rotation of the one of the plurality of supporting shafts to control tension of the narrow magnetic tape supported on the roller member mounted on the one of the plurality of supporting shafts. Therefore, by making the tension of the individual magnetic tapes uniform, productivity and product quality can be stabilized and improved and yield can also be improved.

Furthermore, according to the present invention, a driving source (for example, a motor) is unnecessary and hence the space required for the wiring of the driving source etc. is unnecessary, offering also the advantage that space savings can be accomplished.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a side view of a slitter;

DETAILED DESCRIPTION OF THE PREFERRED EMBODIMENTS

Preferred embodiments of a magnetic tape manufacturing apparatus related to the present invention will be described below with reference to the attached drawings.

Figure 1:
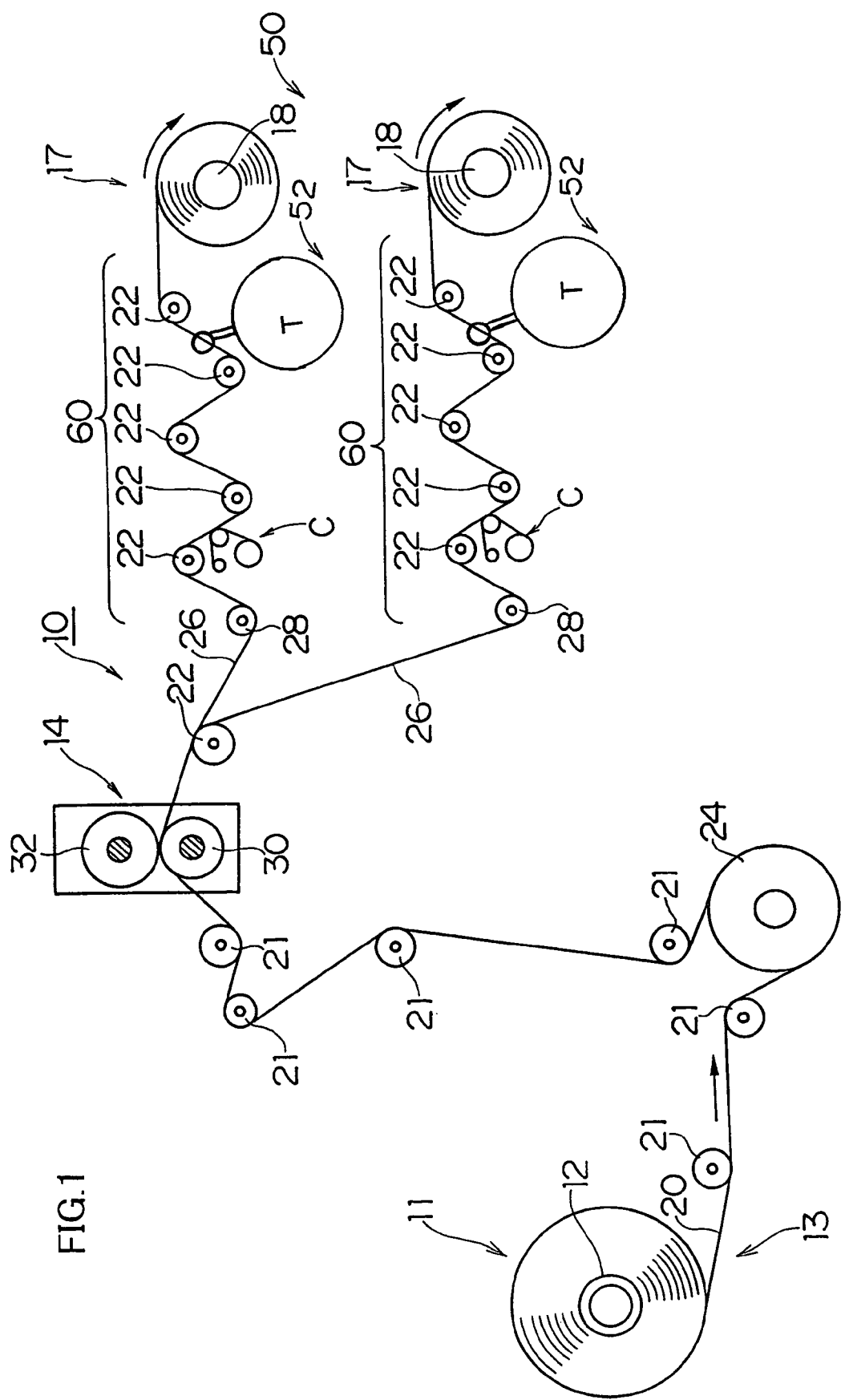
FIG. 1 is a configuration view of a magnetic tape manufacturing apparatus used in the present invention.

A magnetic tape manufacturing apparatus 10 according to an embodiment of the present invention, which is shown in FIG. 1 as an example, comprises a tape supply device 13, which draws out a wide web-like magnetic tape material 20 wound in roll form from the delivery side; a slitter 14, which slits the magnetic tape material 20 into a plurality of narrow magnetic tapes 26; a tape take-up device 50, which takes up the magnetic tapes 26 individually on hubs (cores) 18 of winding reels 17 on the take-up side; and a tape transporting device 60, which is provided between the slitter 14 and the tape take-up device 50 and guides the individual magnetic tapes 26 to the tape take-up device 50 while supporting the respective magnetic tapes by means of roller members 22, 22 . . . , which are guide rollers. FIG. 2 is a schematic illustration of an example of the slitter 14.

As shown in FIG. 1, in the tape supply device 13, the magnetic tape material 20 wound in roll form is attached to a hub 12 (a core) of an unwinding reel 11. Usually, the magnetic tape material 20 is manufactured by forming a magnetic layer containing ferromagnetic particles on a non-magnetic backing layer by the application process, the vacuum deposition process, etc. and by subjecting the magnetic layer to orientation treatment, drying treatment, surface treatment, etc.

The slitter 14 has a plurality of pairs of upper and lower rotary blades 30 and 32 to slit the wide web-like magnetic tape material 20 into the plurality of narrow magnetic tapes 26, 26, . . . by giving a shearing force to the magnetic tape material 20 between the lower rotary blades 30 and the upper rotary blades 32. As shown in FIG. 2, the plurality of lower rotary blades 30, 30, . . . are formed as bed knives in roller form, and the plurality of upper rotary blades 32, 32, . . . are formed as thin disks.

The lower rotary blades 30 are engaged and fixed to a lower shaft 34 with spacers 36, and the upper rotary blades 32 are engaged and fixed to an upper shaft 38 parallel to the lower shaft 34 with spacers 40. The lower rotary blades 30 and the upper rotary blades 32 are arranged so that their sharp edges work one against the other. The upper rotary blades 32 are urged by a spring (not shown) toward the right side in FIG. 2 along the shaft 38 and positioned with the cutting edge portions of the upper rotary blades 32 abutting against the cutting edge portions of the lower rotary blades 30. The upper shaft 38 and the lower shaft 34 are respectively connected to motors 41 and 43, which can vary rotational speed freely so that the peripheral speed of the upper rotary blades 32 and the peripheral speed of the lower rotary blades 30 can be individually varied.

Between the unwinding reel 11 and the slitter 14 are arranged a plurality of guide rollers 21, 21, . . . , which constitute a transporting path of the magnetic tape material 20, and a grooved suction drum 24, which controls the transporting speed of the magnetic tape material 20. The grooved suction drum 24 is connected to a motor (not shown) capable of varying rotational speed freely, and appropriately varies the transporting speed of the magnetic tape material 20 by rotating with the magnetic tape material 20 sucked on the peripheral surface of the grooved suction drum 24.

The rotational speed of the hub 18 (the core) of the winding reel 17 in the tape take-up device 50 is controlled on the basis of the peripheral speed of the grooved suction drum 24. A device which controls the transporting speed of the magnetic tape material 20 is not limited to the grooved suction drum 24, and it is also possible to use other mechanisms such as a pair of a capstan and a pinch roller which pinch and transport the magnetic tape material 20.

The tape transporting device 60 is provided between the slitter 14 and each of the winding reels 17. Each tape transporting device 60 is provided with a tension roller 28 and a plurality of roller members 22, 22, . . . . The tension in the transporting direction of the magnetic tape material 20 during slitting is arbitrarily adjusted by the tension roller 28. Each tape transporting device 60 is also provided with a cleaning device C etc. if required as shown in the drawing.

Figure 3A:
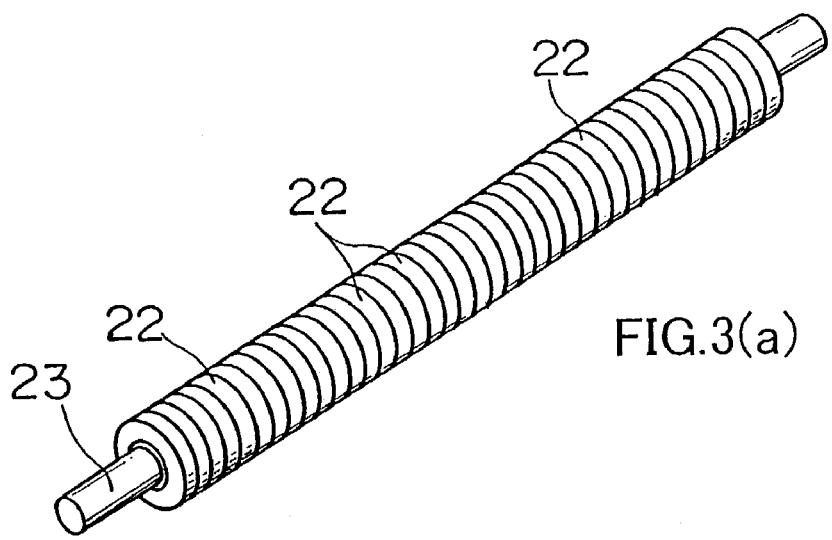
FIGS. 3(a) and 3(b) are configuration views of roller members used in a magnetic tape manufacturing apparatus of the present invention.
Figure 3B:
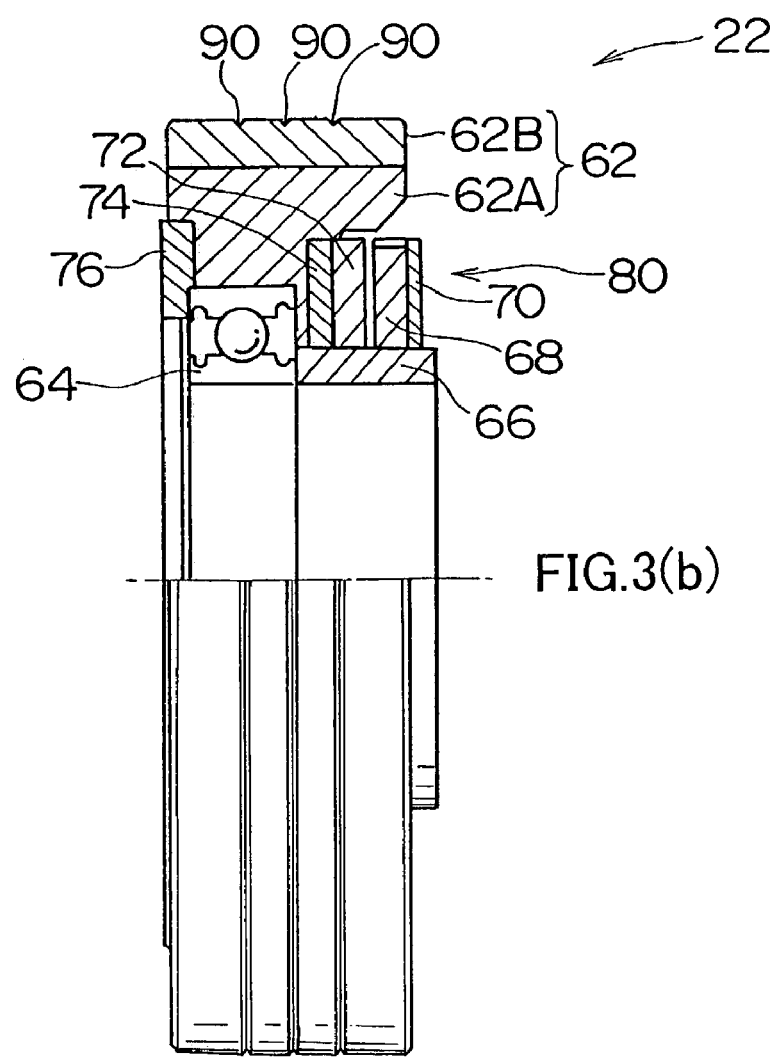

FIGS. 3(a) and 3(b) are configuration views of roller members 22 used in the tape transporting device 60 in the magnetic tape manufacturing apparatus 10 according to the embodiment of the present invention. FIG. 3(a) is a perspective view showing how the plurality of roller members 22, 22, . . . are supported by a supporting shaft 23, and FIG. 3(b) is a partial sectional view showing the construction of one of the roller members 22. In FIG. 3(b), the upper half is shown in section.

The roller member 22 is constituted by a boss 62 forming the outer peripheral portion, a bearing 64 fitted into the inner circumference of the boss 62, a stopper ring 76 to prevent the bearing 64 from slipping off, and an eddy current type clutch 80.

The boss 62 is constituted by two members: a boss main body 62A which is a member disposed on the inner circumference side, and a crown ring 62B which is a member disposed on the outer peripheral side of the boss main body 62A. This constitution is advantageous because the boss main body 62A which requires dimensional accuracy can be fabricated from a metal material, for example, and because the crown ring 62B which requires the control of hardness, crown shape, etc. can be fabricated from a rubber material, a resin material, etc., for example. However, the boss main body 62A and the crown ring 62B may be fabricated by a one-piece material.

Grooves 90, 90, 90 to exclude entrained air of the magnetic tape 26 are formed on the outer peripheral surface of the boss 62. Also, the inner circumferential diameter of the bearings 64, 64 has such a size that allows the supporting shaft 23 to be fitted into.

In the present invention, it is required that at least one roller member 22 of the roller members 22, 22 . . . of the tape transporting device 60 be provided with an eddy current type clutch 80 as shown in the drawings.

Figure 4A:
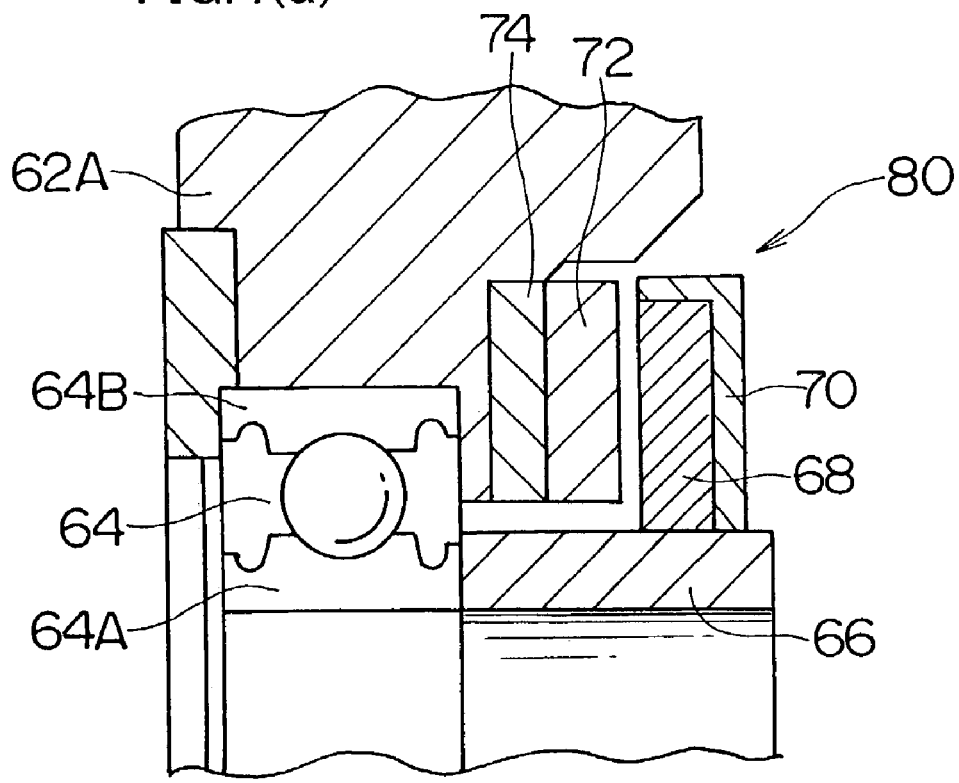
FIGS. 4(a) and 4(b) are partial configuration views of an eddy current type clutch.
Figure 4B:
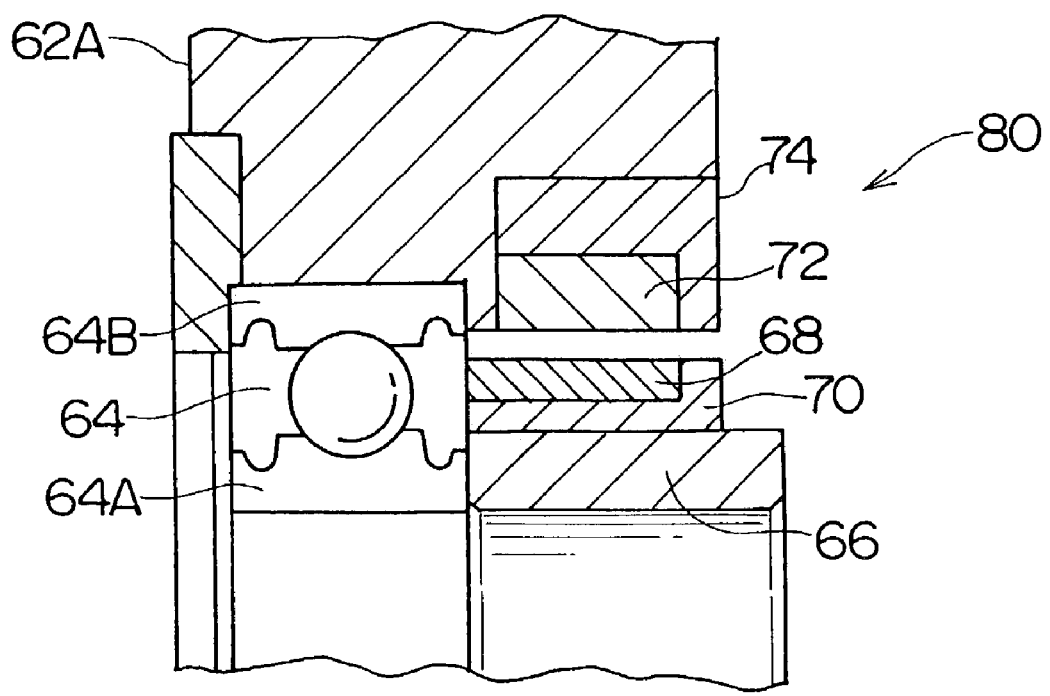

FIGS. 4(a) and 4(b) are views showing the construction of an eddy current type clutch 80. FIG. 4(a) is a partially enlarged view of FIG. 3(b), and FIG. 4(b) is a partially enlarged view of an example that is a little different from the eddy current type clutch of FIG. 4(a). Both drawings show the construction of the roller members 22 corresponding to one magnetic tape 26.

In FIG. 4(a), a magnet holding ring 66 is fitted onto the supporting shaft 23 not shown in the drawing (refer to FIG. 3(a)). Similarly, an inner ring 64A of a bearing 64 is also fitted onto the supporting shaft 23. Therefore, the magnet holding rings 66 and the inner rings 64A of the bearings 64 of all roller members 22 rotate integrally with the supporting shaft 23. In order to ensure that the magnet holding ring 66 also serves as a spacer ring, the width of the magnet holding ring 66 is formed in such a manner that the magnet holding ring 66 protrudes from the end surface of the boss 62 (62A).

A flange 70 is formed at the outer periphery in the vicinity of the right-hand portion of the magnetic holding ring 66, depressions are formed at equal intervals on the same circumference of a circle on the left side of the flange 70, and a magnet 68 is fitted into each of these depressions. In order to prevent the leakage of magnetic flux, it is preferred that the flange 70 be made of iron.

On the other hand, on the right side of the inner circumferential portion of the boss main body 62A, ring-shaped conductor plates 72 having roughly the same size of the flange 70 are arranged at a prescribed distance from the magnets 68 so as to be opposed thereto. The conductor plates 72 are fixed to the right side of the inner circumferential portion of the boss main body 62A through iron rings 74 to prevent the leakage of magnetic flux. The size and shape of the iron ring 74 are almost the same as those of the conductor plate 72. The conductor plate 72 is made of copper or aluminum etc.

The outer ring 64B of the bearing 64 is fitted onto the inner circumferential portion of the boss main body 62A and, as described above, the conductor ring 72 and iron ring 74 are also fixed to the boss main body 62A. Therefore, the boss main body 62A, conductor plate 72 and iron ring 74 of each of the roller members 22 rotate integrally with the outer ring 64B of the bearing 64. Also, these members can rotate independently of the supporting shaft 23.

As a result of a constitution as described above, the eddy current type clutch 80 is formed between each of the boss main bodies 62A etc. and the supporting shaft 23. When the supporting shaft 23 of the roller member 22 is driven so as to transport the magnetic tape 26, each eddy current type clutch 80 transmits the rotation of the supporting shaft 23 to each of the boss main bodies 62A. In the eddy current type clutch 80, an eddy current is generated in the conductor plate 72 in response to a relative motion between the magnet 68 which rotates along with the supporting shaft 23 and the conductor plate 72 which is fixed to the boss main body 62A and opposed to the magnet 68. Due to the attraction by a primary magnetic flux by the magnet 68 and a secondary magnetic flux by the eddy current generated in the conductor plate 72, each of the boss main bodies 62A is rotationally driven at a given torque in response to the rotation of the supporting shaft 23.

The torque of the eddy current type clutch 80 is in proportion to a difference in the rotational speed of the supporting shaft 23 and the rotational speed of each of the boss main bodies 62A. For this reason, in a case where the difference in the length of magnetic tapes 26 is 0.1%, also the rotational speed of the eddy current type clutch 80 shows a difference of 0.1% and the difference in the tension which is applied is suppressed to 0.1%. Therefore, the tension of each of the magnetic tapes 26 becomes uniform.

In this manner, the tension applied to the magnetic tapes 26 can be controlled by the eddy current type clutch 80 and it is possible to make the tension of a plurality of magnetic tapes 26 uniform. Incidentally, the construction of the eddy current type clutch 80 which controls tension is not limited to the above-described construction, and other constructions can be adopted.

Although FIG. 4(b) shows an eddy current type clutch 80 based on a similar principle, this eddy current type clutch 80 differs from that of FIG. 4(a) in some points of construction. In FIG. 4(b), the flange 70, conductor plate 72 and iron ring 74 are formed in the shape of a wide and thin-walled ring. However, the functions of all of these components are almost the same as those shown in FIG. 4(a).

Although the magnet 68 is fixed on the side of the supporting shaft 23 and the conductor plate 72 and iron ring 74 are fixed on the side of the boss main body 62A in the above two examples, it is also possible to adopt a construction which is reverse to this. The radial position of the roller members 22 in which the eddy current type clutch 80 is arranged is not especially limited.

An eddy current type clutch disclosed in Japanese Patent Application Publication No. 2000-185850, for example, etc. can also be adopted.

Incidentally, various publicly known devices such as a slip ring can be adopted as a device for taking out the eddy current generated in the conductor plate 72 to the outside.

Next, a method of controlling the tension of the magnetic tape 26 will be described below. The magnetic tape manufacturing apparatus 10 is provided with a tension detection device 52 for each magnetic tape 26, as shown in FIG. 1. This tension detection device 52 in which a publicly known constitution is adopted is generally called a tension pick etc.

From the tension detected by this tension detection device for each magnetic tape 26, feedback control is performed to the number of revolutions of the supporting shaft 23 and the tension of each magnetic tape 26 is made uniform by a desired value. Incidentally, it is also possible to adopt a constitution in which what is called open control is performed.

Figure 5:
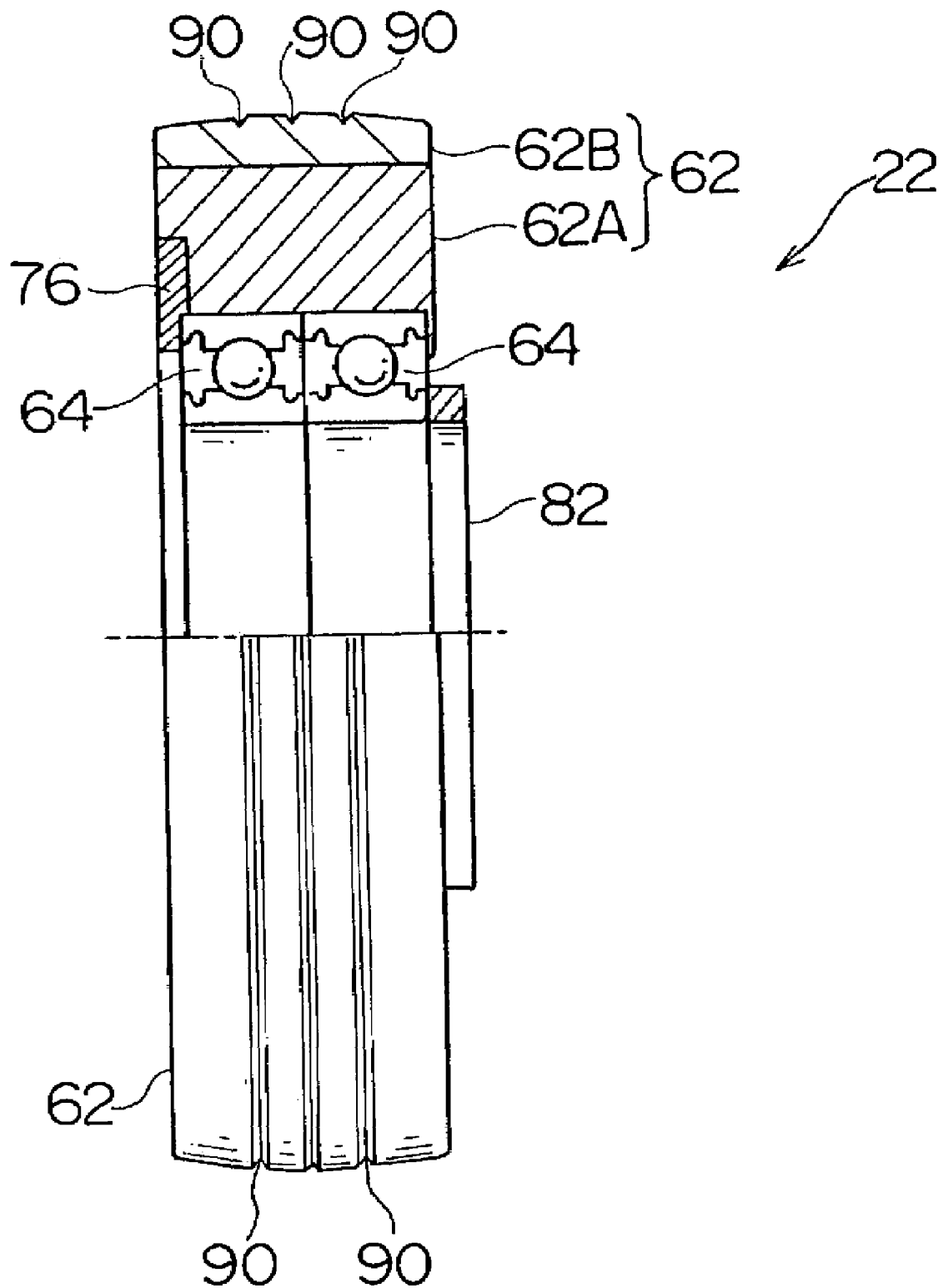
FIG. 5 is a configuration view of another embodiment of roller members.

FIG. 5 is a configuration view of a roller member 22 having no eddy current type clutch 80 which can be used in the transporting device 60 and corresponds to FIG. 3(b). The upper half of this drawing is shown in section. Incidentally, the same members as in FIGS. 3(a) and 3(b) or members similar to those in FIGS. 3(a) and 3(b) are given the same reference numbers and characters and their descriptions are omitted. The roller member 22 is constituted by a boss 62 which composes an outer peripheral portion, bearings 64, 64, a spacer ring 82 which performs the action of adjustment of a gap from an adjacent roller member 22, and a stopper ring 76.

Grooves 90, 90, 90 to exclude entrained air of the magnetic tape 26 are formed on the outer peripheral surface of the boss 62. Also, the inner circumferential diameter of the bearings 64, 64 has such a size that allows the supporting shaft 23 to be fitted into.

It is preferred that the outer peripheral surface of at least one roller member 22 of the roller members 22, 22 . . . of the tape transporting device 60 be formed to have a crown.

"Crown" is defined in a pulley mechanism in mechanics, and denotes that the section of a rim surface of a belt pulley is formed in convex shape in order to automatically prevent a belt from becoming detached. It is said that the contour of a crown is such that a circular arc is used, two conical surfaces are combined, a cylindrical surface is sandwiched with two conical surfaces, and the like (refer to the Dictionary of Machines, Corona Sha, 1986).

Even when a belt (mainly a flat belt) is unevenly wound onto a belt pulley to one side, the belt moves to a portion of large diameter as the belt pulley rotates. Therefore, when the diameter of a middle portion of a belt pulley in the width direction thereof is formed to be larger than the diameter of the ends in the width direction, the belt moves to the middle portion of the belt pulley in the width direction thereof as the belt pulley rotates and the motion of the belt becomes stable. The above action also applies a combination of the roller member 22 of this magnetic tape manufacturing apparatus 10 and the magnetic tape 26.

The outer peripheral surface of the roller member 22 is preferably formed from a material having hardness in the range of 30 to 95 specified in JIS K6301A and more preferably formed from a material having hardness in the range of 60 to 90. This is because the crown of the outer peripheral surface of the roller member 22 is deformed and the crown cannot display its effect if the hardness is less than 30 and flaws are apt to occur in the magnetic tape 26 if the hardness exceeds 95, both cases being inappropriate.

The radius of curvature of the outer peripheral surface of the roller member 22 is preferably in the range of 50 to 100 mm and more preferably in the range of 50 to 85 mm for a magnetic tape having a width of 4 mm. For a magnetic tape having a width of 30 mm (1.2 inches), the radius of curvature of the outer peripheral surface of the roller member 22 is preferably in the range of 500 to 2000 mm and more preferably in the range of 1000 to 2000 mm. In this manner, optimum ranges suitable for the width of the magnetic tape 26 have been experimentally ascertained.

As described above, the configuration of the crown in which the outer peripheral surface of the roller member 22 is a circular arc in section was described. However, the crown shape is not limited to the above and it is possible to adopt various sectional shapes, such as a trapezoidal section, a parabolic section, an elliptic shape, a hyperbolic section, a section obtained by combining two conical surfaces, and a section obtained by sandwiching a cylindrical surface with conical surfaces.

The composition ratio of roller members 22 not provided with such an eddy current type clutch 80 to the roller members provided with the eddy current type clutch 80 shown in FIGS. 3(b), 4(a) and 4(b) can be optimized by the width of the magnetic tape 26, material of the magnetic tape 26, manufacturing conditions, etc.

Incidentally, as a matter of course, it is also possible to adopt the construction shown in FIG. 5, in which the outer peripheral surface of the roller member 22 is formed in crown shape and given a prescribed hardness, to the roller member 22 provided with the eddy current type clutch 80 shown in FIGS. 3(b), 4(a) and 4(b).

Also, the position, number, etc. of the roller members 22 provided in the tape transporting device 60 are not limited to the constitution shown in the drawings and various modes can be adopted. Also, even if the outer peripheral surface of the roller member 22 is not formed in crown, the present invention is effective.

Next, the operation of the magnetic tape manufacturing apparatus 10 configured as described above will be described below. First, the magnetic tape material 20 in roll form which is wound on the unwinding reel 11 of the tape supply device 13 is continuously drawn out of the unwinding reel 11 and transported to the slitter 14. And by use of the slitter 14 the magnetic tape material 20 is slit into a plurality of magnetic tapes 26, each of which is transported by the roller members 22, 22 . . . of the transporting device 60 and wound on the hub 18 of the winding reel 17 of the tape take-up device 50. As a result of this, for example, the magnetic tape material 20 is slit into 100 to 500 portions and magnetic tapes 26 each having a specified width (for example, 12.65 mm, 25.4 mm or 3.81 mm) are produced.

In this series of steps, at least one roller member 22 of the roller members 22, 22 . . . of the tape transporting device 60 is provided with the eddy current type clutch 80 and the tension of the magnetic tapes 26 during transporting can be controlled, so that problems ascribable to the slack of magnetic tapes etc. will not arise even if the length of magnetic tapes shows variations to some extent.

As described above, according to the present invention, in the tape transporting device which is provided between the slitter and the tape take-up device and guides the narrow magnetic tapes to the tape take-up device, the plurality of roller members supporting the narrow magnetic tapes are mounted on the plurality of supporting shafts, respectively, and an eddy current type clutch is internally mounted on at least one of the plurality of supporting shafts so that the eddy current type clutch controls rotation of the one of the plurality of supporting shafts to control tension of the narrow magnetic tape supported on the roller member mounted on the one of the plurality of supporting shafts. Hence, by making the tension of the individual magnetic tapes uniform, productivity and product quality can be stabilized and improved and yield can also be improved.

Furthermore, according to the present invention, a driving source (for example, a motor) is unnecessary and hence the space required for the wiring of the driving source etc. is unnecessary, offering also the advantage that space savings can be accomplished.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A magnetic tape manufacturing apparatus, comprising:
   a tape supply device which draws out a wide web-like magnetic tape material wound in roll form from a delivery side;
   a slitter which slits the magnetic tape material into a plurality of narrow magnetic tapes;
   a tape take-up device which takes up the narrow magnetic tapes individually on cores on a take-up side; and
   a tape transporting device which is provided between the slitter and the tape take-up device and guides the narrow magnetic tapes to the tape take-up device, wherein:
   the tape transporting device includes a plurality of roller members which support the narrow magnetic tapes, respectively,
   the plurality of roller members are mounted on a plurality of supporting shafts, respectively,
   at least one eddy current clutch is mounted on at least one of the plurality of supporting shafts, said at least one eddy current clutch being internally mounted in a corresponding one of said plurality of roller members, said at least one eddy current type clutch controlling rotation of the corresponding one of said roller members mounted on said one of the plurality of supporting shafts to control tension of the narrow magnetic tape supported on the corresponding one of said roller members,
   at least one tension detection device provided for at least one of the plurality of narrow magnetic tapes, and
   a means for providing feedback control of a number of revolutions of the at least one supporting shaft based on a tension detected by the tension detection device to control rotation of the at least one of the supporting shafts to control the tension of the magnetic tape supported by the one of said plurality of roller members.

2. The magnetic tape manufacturing apparatus according to claim 1, wherein a torsion force is applied to the corresponding one of said roller members proportional to a difference in rotational speed between the corresponding one of said roller members and said one of the plurality of supporting shafts through said at least one eddy current clutch.

3. The magnetic tape manufacturing apparatus according to claim 1, wherein at least one groove for excluding entrained air of at least one narrow magnetic tape is formed in an outer peripheral surface of at least one of the roller members.

4. A magnetic tape manufacturing apparatus, comprising:
a tape supply device which draws out a wide web-like magnetic tape material wound in roll form from a delivery side;
   a slitter which slits the magnetic tape material into a plurality of narrow magnetic tapes;
   a tape take-up device which takes up the narrow magnetic tapes individually on cores on a take-up side; and
   a tape transporting device which is provided between the slitter and the tape take-up device and guides the narrow magnetic tapes to the tape take-up device, wherein:
   the tape transporting device includes a plurality of roller members which support the narrow magnetic tapes, respectivel,
   the plurality of roller members are mounted on a plurality of supporting shafts, respectively,
   at least one eddy current clutch is mounted on at least one of the plurality of supporting shafts, said at least one eddy current clutch being internally mounted in a corresponding one of said plurality of roller members, said at least one eddy current type clutch controlling rotation of the corresponding one of said roller members mounted on said one of the plurality of supporting shafts to control tension of the narrow magnetic tape supported on the corresponding one of said roller members,
   a plurality of tension detection devices, wherein one tension detection device is provided for each one of the plurality of narrow magnetic tapes, and
   a means for providing feedback control of a number of revolutions of the at least one supporting shaft based on a tension detected by the tension detection device to control rotation of the at least one of the supporting shafts to control the tension of the magnetic tape supported by the one of said plurality of roller members.

5. The magnetic tape manufacturing apparatus according to claim 4, wherein at least one groove for excluding entrained air of at least one narrow magnetic tape is formed in an outer peripheral surface of at least one of the roller members.

6. The magnetic tape manufacturing apparatus according to claim 4, wherein a tension force is applied to the corresponding one of said roller members proportional to a difference in rotational speed between the corresponding one of said roller members.

* * * * *